United States Patent

[11] 3,583,404

| [72] | Inventor | Daniel M. McWhorter |
| | | Arlington Heights, Ill. |
| [21] | Appl. No. | 835,557 |
| [22] | Filed | June 23, 1969 |
| [45] | Patented | June 8, 1971 |
| [73] | Assignee | The Kendall Company |
| | | Boston, |

[54] NONBLOCKING CATHETER
4 Claims, 4 Drawing Figs.
[52] U.S. Cl.................................................. 128/349,
128/240
[51] Int. Cl.................................................. A61m 25/00
[50] Field of Search........................................ 128/240,
241, 348—351, 276

[56] References Cited
UNITED STATES PATENTS

| 2,147,652 | 2/1939 | Kennison.................... | 128/240 |
| 3,314,430 | 4/1967 | Alley et al.................. | 128/350 |
| 3,394,705 | 7/1968 | Abramson.................... | 128/349 |
| 3,482,576 | 12/1969 | Ericson et al................ | 128/349 |

*Primary Examiner*—Dalton L. Truluck
*Attorney*—John F. Ryan

ABSTRACT: An irrigation catheter with drainage and irrigation lumens having means to prevent excessive fluid pressure buildup within a body cavity is provided. In order to avoid excessive fluid pressure in a body cavity due to blocking of the drainage lumen in an irrigation catheter, a multiplicity of fluid bypass connections is provided through the wall which separates the irrigation lumen from the drainage lumen.

PATENTED JUN 8 1971 3,583,404
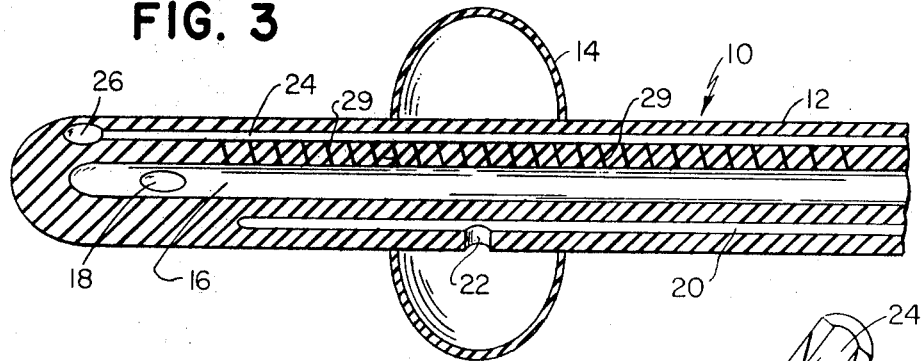
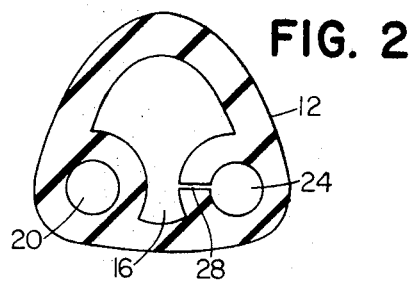
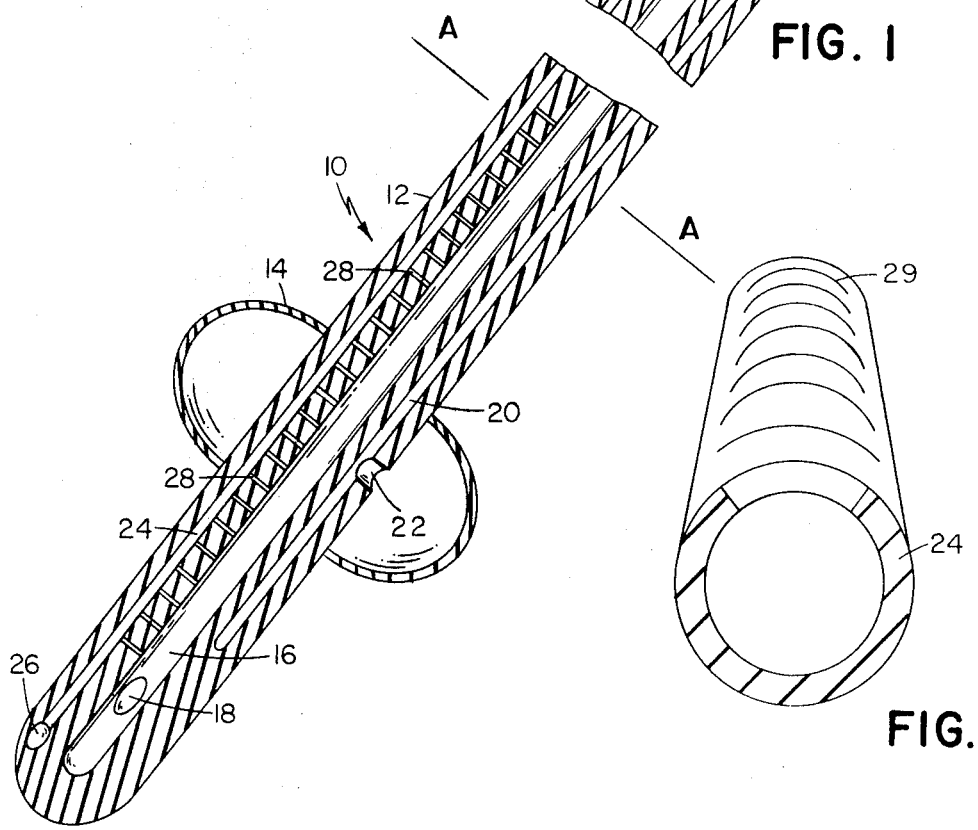
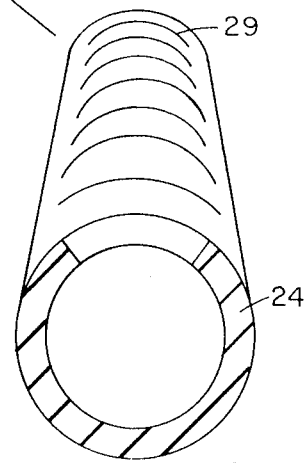

3,583,404

NONBLOCKING CATHETER

This invention relates to irrigation catheters designed for the continuous or intermittent instillation of fluid into a body cavity, with drainage therefrom of said fluid. More particularly, it relates to improvements in the structure of such catheters wherein the fluid being instilled may be wholly or partially bypassed from the irrigation lumen to the drainage lumen of said catheter.

Irrigation of a body cavity such as the bladder is a common postoperative procedure, also frequently indicated in infectious inflammation of the bladder wall and in other conditions. For this purpose, irrigation catheters are provided with a lumen or internal passage, through which irrigation fluid is passed to the site to be treated. The irrigation fluid then is drained away through a drainage lumen which is conventionally a separate passage centered in the catheter body. Due to considerations of patient comfort as the catheter dilates the urethral canal, the size of the catheter is minimized consistent with performance. This means that the drainage lumen is necessarily narrow in diameter, particularly when the catheter is of the retention type, with an inflation balloon and a separate inflation lumen crowded into the body of the catheter. The drainage lumen, therefore, may become occluded by bits of tissue, cellular debris, crystalline matter, or exceptionally viscous fluid drainage. Irrigation fluid forced into the bladder under such circumstances has no outlet, or an outlet which is incapable of providing for escape of fluid as rapidly as is desirable. Such a condition, commonly called blocking, may cause extreme discomfort to the patient due to increased intravesical pressure.

It has now been found that the dangers inherent in catheter blocking may be minimized if a series of bypass openings is provided in the wall of the irrigation lumen, connected with an opening into the drainage lumen.

It is a primary object of this invention to provide a catheter with such openings.

It is another object of the invention to provide a catheter wherein there is a constant diversion of a portion of the inflowing irrigation fluid from the irrigation lumen into the drainage lumen before the irrigation fluid is delivered to the body cavity.

It is still another object of the invention to provide a catheter wherein the connecting openings between the irrigation lumen and the drainage lumen open only at a predetermined fluid pressure.

Other objects of the invention will be better understood from the following description and drawings, in which:

FIG. 1 is a longitudinal cross-sectional view, partly broken away, of the distal and proximal portions of a catheter constructed according to this invention.

FIG. 2 is a lateral cross-sectional view of the catheter of FIG. 1, along the line A-A.

FIG. 3 is a longitudinal cross-sectional view, partly broken away, of the distal portion of a modification of the catheter of this invention, the proximal portion being identical with the proximal portion of the catheter of FIG. 1.

FIG. 4 is a representation of a preformed, precut irrigation tube before its incorporation into the body of the catheter of FIG. 3.

It will be understood herein that by distal portion or distal end of a catheter is meant the end of the catheter which is inserted into the patient. It will also be understood that the present invention is applicable to ordinary irrigation catheters as well as to catheters of the retention balloon type, the latter being illustrated and described as being of the more complex type.

Referring to FIG. 1, a retention catheter 10 is shown as comprising a resilient hollow elastomeric tube with sidewall 12 and an inflation balloon 14. The inflation balloon is inflated in the conventional manner by the introduction of fluid through the inflation lumen 20 which is connected with the balloon by the opening 22.

Located more or less centrally of the catheter body is a conventional drainage lumen 16, terminating near the distal end of the catheter in a drainage eye 18, which may be single or multiple.

Conveniently located opposite the inflation lumen is an irrigation lumen 24, terminating in irrigation eye outlet 26, and designed for the instillation, continuous or intermittent, of fluid. The irrigation lumen of this invention is provided with a multiplicity of small pores or openings 28, connecting with the drainage lumen 16.

By regulation of the size of the openings 28 relative to the principal irrigation outlet 26, a constant proportion of the irrigation fluid, say 10 percent to 20 percent, is diverted into the drainage lumen 16, and never reaches the body cavity. This diversion of fluid not only helps to dislodge material which may be causing blockage in the drainage lumen, but in the case of continuous or frequent irrigation the constant dilution of the contents of the drainage lumen may prevent or minimize blocking in the first instance.

In case the hydrostatic pressure increases at the very distal portion of the irrigation lumen, due to blockage of the drainage lumen or occlusion of the drainage opening 18 or the irrigation opening 26, the proportion of irrigation fluid diverted through openings 28 into the drainage lumen 16 will increase. Thus the risk of building up an uncomfortable or dangerous pressure in the bladder is minimized.

As shown in FIG. 1, the proximal portion of the catheter of this invention is conventional, the irrigation lumen 24, drainage lumen 16, and inflation lumen 20 terminating in separate arms stemming from the main body of the catheter. Inflation fluid may be introduced into and withdrawn from the inflation lumen by means of a hypodermic needle thrust through the Gilbert plug 21. Irrigation fluid may be conveniently introduced into the irrigation lumen 24 by means of an adapter connection from an overhanging container of fluid. The irrigation fluid may also be introduced intermittently by means of a syringe injection into the irrigation lumen 24.

FIG. 2 is a lateral cross section of the body of the catheter along the line A-A of FIG. 1, showing the relative placement of the drainage lumen 16, inflation lumen 20, irrigation lumen 24, and the openings 28 serving as fluid bypass between the irrigation lumen and the drainage lumen.

FIG. 3 represents a modification of the catheter of FIG. 1, wherein the bypass connecting channels between the irrigation lumen and the drainage lumen are in the form of a series of slits 29, cut into the elastomeric wall substance. In normal usage these slits remain closed, acting like closed valves. In case undue pressure develops in the bladder, however, the increased hydrostatic pressure in the irrigation lumen causes these slits 29 to open and discharge irrigation fluid into the drainage lumen. In cases of suspected blockage, the slits may also be opened by grasping the catheter where it enters the body and at its proximal end and applying sufficient tension to stretch the catheter slightly. Irrigation fluid passing from the irrigation lumen into the drainage lumen will usually be sufficient to wash down blood clots, tissue debris, or whatever is responsible for the blockage.

The bypass connections 28 and 29 are most conveniently formed in the process of building the irrigation lumen on a mandrel, by precision burning or cutting of holes, or by bringing against the supported lumen a bank of spaced-apart rotating knives.

Such an operation allows a precise degree of control of the formation of the bypass connections, after which the precut irrigation lumen is incorporated into the body of the catheter in a conventional manner. FIG. 4 illustrates a section of such a precut irrigation lumen 24, with slit-valve openings 29 encompassing a portion of the circumference of the wall of the lumen. In normal catheter construction, as seen in FIG. 3, only a portion of the wall of the irrigation lumen wall serves also as a wall of the drainage lumen, so that the slits 29 need extend only between 10 percent and 30 percent of the circumference of the irrigation lumen, depending on the internal geometry of the final product.

In the case of slit-valve bypass openings as in FIGS. 3 and 4, the use of a siliconized cutting blade will minimize the danger of the slits "healing over" and becoming nonfunctional.

The slits 29 should be so cut as to open when the fluid pressure in the irrigation canal is of the order of 10 to 20 centimeters of water. By varying the spacing, width, or length of the cut slits, irrigation lumens may be fabricated in which the valves open more readily in the distal or inserted portion of the catheter than they do in the proximal or funnel portion. In the case of the catheter of FIGS. 1 and 2, a similar result may be obtained by making the porelike openings 28 of larger diameter in the distal than in the proximal section of the lumen. In this manner, for either version of the catheters of this invention, irrigation fluid is encouraged to empty into the drainage lumen in the distal portion of the catheter, where blockage is most frequent, and the irrigation fluid passes into the drainage lumen only at increasingly greater pressures in the proximal portion of the catheter.

Having thus described my invention, I claim:

1. An irrigation catheter comprising a flexible elongated tube for insertion within a body cavity having distal and proximal ends thereon and being provided with both a drainage and an irrigation lumen extending throughout the length of the tube, said drainage and irrigation lumens being provided with inlet and outlet openings sealed off from one another at the proximal and distal ends of said tube, said lumens adjoining one another and being separated from one another intermediate the said ends thereof by an intervening wall, and means providing lateral fluid communication between said lumens intermediate the ends thereof, said means comprising a multiplicity of fluid bypass connections in said intervening wall between the lumens whereby excessive fluid pressure within a body cavity due to blockage in the catheter can be avoided by diverting fluid through the bypass connections around the blockage.

2. The catheter according to claim 1 in which the bypass connections are a multiplicity of porelike openings in the wall separating the irrigation lumen from the drainage lumen.

3. The catheter according to claim 1 in which the bypass connections are a multiplicity of valvelike slits in the wall separating the irrigation lumen from the drainage lumen, said slits being normally closed but being designed to open under excess fluid pressure.

4. The catheter according to claim 1 in which the fluid bypass connections between the drainage lumen and the irrigation lumen are less resistant to fluid flow in the distal portion of the catheter than they are in the proximal portion.